(12) United States Patent
Joseph et al.

(10) Patent No.: US 11,120,811 B2
(45) Date of Patent: Sep. 14, 2021

(54) POWER OPTIMIZED LINK QUALITY DETECTION AND FEEDBACK

(71) Applicant: QUALCOMM Incorporated, San Diego, CA (US)

(72) Inventors: Alexy Joseph, San Diego, CA (US); Srinivas Krovvidi, Hyderabad (IN); Siddartha Shaik, Hyderabad (IN); Ayan Ghosh, Hyderabad (IN); Sridhar Nomula, Hyderabad (IN); Vivek Mehta, San Diego, CA (US); Anssi Haverinen, San Diego, CA (US); Ravi Alamanda, San Diego, CA (US); Aniketkumar Lata, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 169 days.

(21) Appl. No.: 16/116,057

(22) Filed: Aug. 29, 2018

(65) Prior Publication Data
US 2020/0075032 A1  Mar. 5, 2020

(51) Int. Cl.
*G10L 19/24* (2013.01)
*H04W 24/10* (2009.01)
*H04B 17/309* (2015.01)
*G10L 19/02* (2013.01)
*G10L 19/002* (2013.01)

(52) U.S. Cl.
CPC ........... *G10L 19/24* (2013.01); *G10L 19/002* (2013.01); *H04B 17/309* (2015.01); *H04W 24/10* (2013.01)

(58) Field of Classification Search
CPC ...... G10L 19/24; G10L 19/002; H04W 24/10; H04W 52/287; H04B 17/309
USPC ........................................ 704/500
See application file for complete search history.

(56) References Cited

U.S. PATENT DOCUMENTS

| 9,893,744 B1* | 2/2018 | Patel ............... H04W 16/14 |
| 10,616,743 B2* | 4/2020 | Wojcieszak ....... H04W 72/1215 |
| 2009/0147678 A1* | 6/2009 | Xhafa ............... H04L 47/10 370/232 |
| 2010/0034106 A1* | 2/2010 | Hu .................. H04L 47/263 370/252 |

(Continued)

FOREIGN PATENT DOCUMENTS

EP  1959612 A1 * 8/2008 ........... H04L 1/0018

*Primary Examiner* — Edwin S LeLand, III
(74) *Attorney, Agent, or Firm* — Holland & Hart LLP

(57) ABSTRACT

A Bluetooth component (e.g., a Bluetooth chip) and a digital signal processing (DSP) component (e.g., an audio DSP) of a device may directly handle link condition sensing (e.g., link quality monitoring) and audio bitrate determination. The Bluetooth component may perform link condition sensing (e.g., link quality monitoring) and the Bluetooth component and/or the DSP component may perform link condition processing and audio bitrate determination. Encoding scheme (e.g., audio bitrate) determination and modification may be performed independently by the Bluetooth component and DSP component, such that encoding schemes may be adapted to link conditions while other hardware (e.g., connected to the DSP) is operating in a low power or sleep state. In some cases, the Bluetooth component may sense link conditions and transmit bitrate information directly to audio encoding blocks of the DSP component.

19 Claims, 9 Drawing Sheets

(56) References Cited

U.S. PATENT DOCUMENTS

| | | | | |
|---|---|---|---|---|
| 2010/0054512 | A1* | 3/2010 | Solum | H04R 25/30 |
| | | | | 381/315 |
| 2013/0106927 | A1* | 5/2013 | Seo | H04N 13/341 |
| | | | | 345/691 |
| 2014/0177464 | A1* | 6/2014 | Kanamarlapudi | H04L 1/0002 |
| | | | | 370/252 |
| 2015/0334703 | A1* | 11/2015 | Xu | H04L 1/0002 |
| | | | | 370/253 |
| 2017/0026780 | A1* | 1/2017 | Ryu | H04L 5/0055 |
| 2017/0061171 | A1* | 3/2017 | Lombardi | G06K 7/10019 |
| 2017/0078965 | A1* | 3/2017 | Chen | H04W 12/041 |
| 2017/0086098 | A1* | 3/2017 | Kwon | H04L 47/27 |
| 2017/0303276 | A1* | 10/2017 | Cheng | H04L 1/0015 |
| 2018/0048744 | A1* | 2/2018 | Bhat Noojady Krishna | |
| | | | | H04L 12/10 |
| 2019/0069234 | A1* | 2/2019 | Neelakandan | H04W 28/08 |
| 2019/0104484 | A1* | 4/2019 | Ramirez | H04W 52/267 |
| 2019/0254085 | A1* | 8/2019 | Venkataraman | H04W 76/14 |
| 2019/0304477 | A1* | 10/2019 | Wojcieszak | H04W 28/0268 |
| 2019/0327580 | A1* | 10/2019 | Chang | H04W 4/029 |
| 2020/0008095 | A1* | 1/2020 | Patil | H04W 4/06 |
| 2020/0075032 | A1* | 3/2020 | Joseph | H04W 52/287 |

* cited by examiner

POWER OPTIMIZED LINK QUALITY DETECTION AND FEEDBACK

BACKGROUND

The following relates generally to wireless communications, and more specifically to power optimized link quality detection and feedback.

Wireless communications systems are widely deployed to provide various types of communication content such as voice, video, packet data, messaging, broadcast, and so on. Wireless Personal Area Network (PAN) communications such as Bluetooth communications may allow for short range wireless connections between two or more paired wireless devices (e.g., that have established a wireless communication channel or link).

For example, mobile devices such as cellular phones may utilize wireless PAN communications to exchange data such as audio signals with wireless headsets. In some cases, Bluetooth communications may require enhanced quality of service. For example, successful bidirectional transmission of audio information for voice may have a relatively low tolerance for packet loss or timing issues. As such, the link quality between two devices may affect the data rate used for communications (e.g., as poor link quality may be associated with reduced bitrates for more robust communications). Transitioning between usage of different audio bitrates as link conditions change, however, may be undesirably costly in terms of power consumption and improved techniques are desired.

SUMMARY

The described techniques relate to improved methods, systems, devices, or apparatuses that support power optimized link quality detection and feedback. Generally, the described techniques provide for a signaling mechanism to support encoding scheme (e.g., audio bitrate) determination and modification related to a Bluetooth component (e.g., a Bluetooth chip) and a digital signal processing (DSP) component of a device.

A DSP component may signal one or more packets, encoded according to a first audio bitrate, to a Bluetooth component. The Bluetooth component may transmit the one or more packets (e.g., encoded according to the first audio bitrate) to a second device (e.g., a second Bluetooth device that the device is paired with). The Bluetooth component may further monitor the link condition between the device and the paired device, and may signal one or more link condition parameters to the DSP component based on the link condition sensing. In some cases, the Bluetooth component may determine an adjusted audio bitrate, and the link quality feedback (e.g., the link condition parameters) may include an adjusted audio bitrate.

Additionally or alternatively, link condition parameters signaled from the Bluetooth component to the DSP component may include one or more other parameters indicative of the link condition (e.g., such as a throughput parameter, a Bluetooth connect (BTC) condition, a flow stop parameter, a static multi-link condition). In such cases, the DSP component may determine an adjusted audio bitrate, or modify the adjusted audio bitrate indicated by the Bluetooth component based on received link condition parameters. In some cases, the link condition parameters may be sent from the Bluetooth component to the DSP component while an applications processor (or other processor in communication with the DSP) is operating in a first mode (e.g., a low power or a sleep mode). The DSP may then signal one or more packets, encoded according to the adjusted audio bitrate, to the Bluetooth component, and the Bluetooth component may transmit the one or more packets (e.g., encoded according to the adjusted audio bitrate) to the second device.

A method of wireless communication is described. The method may include transmitting, by a Bluetooth component to a second device, one or more packets encoded according to a first audio bitrate, determining, at the Bluetooth component, a link condition based at least in part the transmitting, signaling, from the Bluetooth component to a DSP, a link condition parameter, signaling, from the DSP to the Bluetooth component, one or more packets encoded according to a second audio bitrate that is based on the link condition parameter, and transmitting, by the Bluetooth component to the second device, one or more packets encoded according to the second audio bitrate.

An apparatus for wireless communication is described. The apparatus may include a processor, memory in electronic communication with the processor, and instructions stored in the memory. The instructions may be executable by the processor to cause the apparatus to transmit, by a Bluetooth component to a second device, one or more packets encoded according to a first audio bitrate, determine, at the Bluetooth component, a link condition based at least in part the transmitting, signal, from the Bluetooth component to a DSP, a link condition parameter, signal, from the DSP to the Bluetooth component, one or more packets encoded according to a second audio bitrate that is based on the link condition parameter, and transmit, by the Bluetooth component to the second device, one or more packets encoded according to the second audio bitrate.

Another apparatus for wireless communication is described. The apparatus may include means for transmitting, by a Bluetooth component to a second device, one or more packets encoded according to a first audio bitrate, determining, at the Bluetooth component, a link condition based at least in part the transmitting, signaling, from the Bluetooth component to a DSP, a link condition parameter, signaling, from the DSP to the Bluetooth component, one or more packets encoded according to a second audio bitrate that is based on the link condition parameter, and transmitting, by the Bluetooth component to the second device, one or more packets encoded according to the second audio bitrate.

A non-transitory computer-readable medium storing code for wireless communication is described. The code may include instructions executable by a processor to transmit, by a Bluetooth component to a second device, one or more packets encoded according to a first audio bitrate, determine, at the Bluetooth component, a link condition based at least in part the transmitting, signal, from the Bluetooth component to a DSP, a link condition parameter, signal, from the DSP to the Bluetooth component, one or more packets encoded according to a second audio bitrate that is based on the link condition parameter, and transmit, by the Bluetooth component to the second device, one or more packets encoded according to the second audio bitrate.

Some examples of the method, apparatuses, and non-transitory computer-readable medium described herein may further include operations, features, means, or instructions for selecting, at the Bluetooth component, the second audio bitrate for a Bluetooth communication to be performed based on the link condition, where the link condition parameter includes the second audio bitrate.

Some examples of the method, apparatuses, and non-transitory computer-readable medium described herein may further include operations, features, means, or instructions for selecting, at the DSP, the second audio bitrate for a Bluetooth communication to be performed based on the link condition parameter, where the link condition parameter includes a throughput parameter, a Bluetooth connect (BTC) condition, a flow stop parameter, a static multi-link condition, or some combination thereof.

In some examples of the method, apparatuses, and non-transitory computer-readable medium described herein, signaling the link condition parameter from the Bluetooth component to the DSP may include operations, features, means, or instructions for signaling, from the Bluetooth component to an encoding block of the DSP, the link condition parameter.

In some examples of the method, apparatuses, and non-transitory computer-readable medium described herein, signaling the link condition parameter from the Bluetooth component to the DSP may include operations, features, means, or instructions for signaling, from the Bluetooth component to an applications processor, the link condition parameter and signaling, from the applications processor to the DSP, the link condition parameter.

In some examples of the method, apparatuses, and non-transitory computer-readable medium described herein, signaling the link condition parameter from the Bluetooth component to the DSP may include operations, features, means, or instructions for signaling the link condition parameter from the Bluetooth component to the DSP while an applications processor may be operating in a low power mode.

Some examples of the method, apparatuses, and non-transitory computer-readable medium described herein may further include operations, features, means, or instructions for determining that the link condition may be below a threshold and selecting the second audio bitrate based on the determination, where the second audio bitrate may be less than the first audio bitrate.

Some examples of the method, apparatuses, and non-transitory computer-readable medium described herein may further include operations, features, means, or instructions for determining that the link condition may be above a threshold and selecting the second audio bitrate based on the determination, where the second audio bitrate may be greater than the first audio bitrate.

Some examples of the method, apparatuses, and non-transitory computer-readable medium described herein may further include operations, features, means, or instructions for determining, at the DSP, that a status of an encoded audio buffer satisfies a second threshold, where the second audio bitrate may be further selected based on determining that the status of the encoded audio buffer satisfies the threshold.

Some examples of the method, apparatuses, and non-transitory computer-readable medium described herein may further include operations, features, means, or instructions for signaling, from the DSP to the Bluetooth component, one or more packets encoded according to the first audio bitrate.

DETAILED DESCRIPTION

Figure 1:
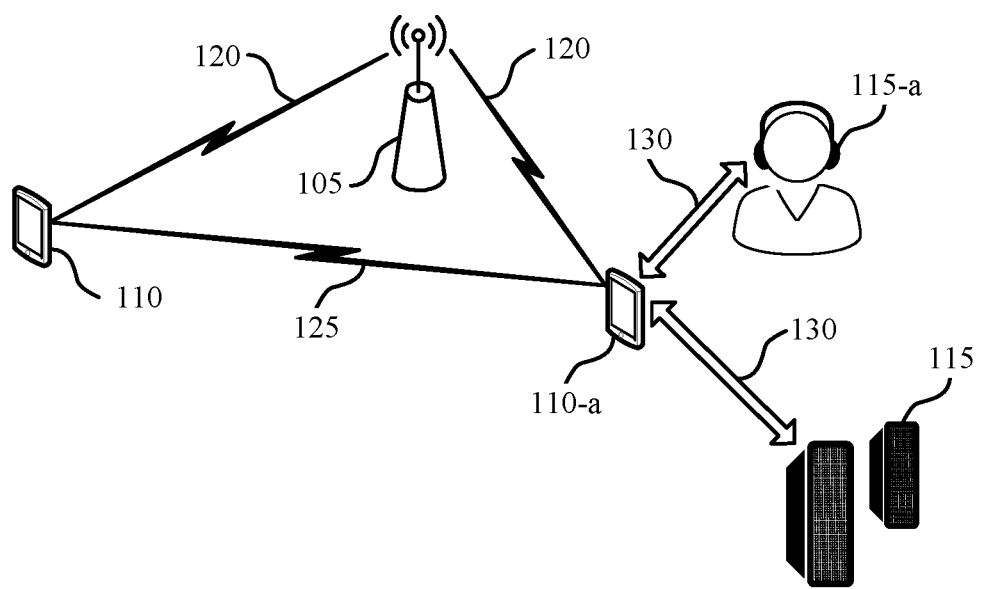
FIG. 1 illustrates an example of a system for wireless communications that supports power optimized link quality detection and feedback in accordance with aspects of the present disclosure.

Bluetooth communications (e.g., such as bidirectional transmission of audio information for voice) may have a relatively low tolerance for packet loss or timing issues. Further, to support high quality Bluetooth communications, it may be desirable to employ high bitrates for Bluetooth transmissions (e.g., high quality Bluetooth audio may demand high bitrates). Link conditions between two paired Bluetooth devices may have an impact on the data throughput (e.g., the audio bitrates) achievable while maintaining such a relatively low tolerance for packet loss.

For example, poor link conditions, affected by noise, distance, interference, etc., may be associated with increased occurrence of information loss during wireless communications. In cases where link conditions are poor, wireless communications may employ reduced bitrates (e.g., which may be associated with reduced data throughput), as reduced bitrates may introduce redundant information bits, such that the information may be conveyed more robustly. For example, reduced bitrates that introduce redundancy into data transmissions may be more robust to some information loss due to poor link quality. In cases where link conditions are strong, higher bitrates may be used as the channel or link is less likely to be associated with loss of information. As such, it may be desirable to adapt encoding schemes (e.g., audio bitrates) to varying link conditions (e.g., varying signal and noise conditions), as it may be desirable to employ the highest audio bitrates feasible given the link quality. However, such encoding scheme modifications (e.g., transitioning between usage of different audio bitrates) may result in increased power consumption associated with link condition sensing and corresponding encoding scheme determination.

The described techniques may provide for power efficient link condition sensing and corresponding encoder bitrate modification. A Bluetooth component (e.g., a Bluetooth chip) and a digital signal processing (DSP) component (e.g., an audio DSP) of a device may handle link condition sensing (e.g., link quality monitoring) and audio bitrate determination. Accordingly, other hardware of the device, which may be costlier to operate in terms of power consumption, may remain in a low power or sleep state. For example, the Bluetooth component may perform link condition sensing (e.g., link quality monitoring) and the Bluetooth component and/or the DSP component may perform link condition processing and audio bitrate determination. The described signaling between a Bluetooth component and a DSP component of a device may result in reduced power consumption, as the direct signaling may alleviate the need to power other hardware components of the device (e.g., such as an applications processor of the device). That is, according to some examples, encoding scheme (e.g., audio bitrate) determination and modification may be performed independently by the Bluetooth component and DSP component, such that other hardware need not process or pass along information for (e.g., and thus need not consume power for) encoding scheme adaptations. Further, signaling between the Bluetooth component and the DSP component may provide for quicker encoding modifications, as the Bluetooth chip may sense link conditions and transmit bitrate information directly to audio encoding blocks.

Aspects of the disclosure are initially described in the context of a wireless communications system. Example devices and process flows implementing the described techniques are then discussed. Aspects of the disclosure are further illustrated by and described with reference to apparatus diagrams, system diagrams, and flowcharts that relate to power optimized link quality detection and feedback, which may in some cases be associated with Bluetooth firmware.

FIG. 1 illustrates a wireless communications system 100 (e.g., which may include to refer to a wireless personal area network (PAN), a wireless local area network (WLAN), a Wi-Fi network) configured in accordance with various aspects of the present disclosure. In the present example, devices in wireless communications system 100 may support Bluetooth communications with one or more paired devices 115. For example, devices 110 may include cell phones, mobile stations, personal digital assistant (PDAs), other handheld devices, netbooks, notebook computers, tablet computers, laptops, or some other suitable terminology. Paired devices 115 may include Bluetooth devices capable of pairing with other Bluetooth devices (e.g., such as devices 110), which may include wireless headsets, speakers, ear pieces, headphones, display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth allows for the creation of a wireless PAN between a master device and one or more slaves devices. In some cases, a device 110 may general refer to a master device, and a paired device 115 may refer to a slave device in a PAN. As such, in some cases, a device may be referred to as either a device 110 or a paired device 115 based on the configuration of the Bluetooth configuration between the device and a second device. That is, designation of a device as either a device 110 or a paired device 115 may not necessarily indicate a distinction in device capability, but rather may refer to or indicate roles held by the device in the PAN. Generally, device 110 may refer to a wireless communication device capable of wirelessly exchanging data signals with another device, and paired device 115 may refer to a device operating in a slave role, or to a short-range wireless device capable of exchanging data signals with the mobile device (e.g., using Bluetooth communication protocols).

Bluetooth systems (e.g., aspects of wireless communications system 100) may be organized using a master-slave relationship employing a time division duplex protocol having, for example, defined time slots of 625 mu secs, in which transmission alternates between the master (e.g., device 110) and slave (e.g., paired device 115). In some cases, certain types of Bluetooth communications (e.g., such as high quality or high definition (HD) Bluetooth) may require enhanced quality of service.

For example, in some cases, Bluetooth traffic may have higher priority than WLAN traffic and may be delay-sensitive. In some cases, Bluetooth device may be compatible with certain Bluetooth profiles to use desired services. A Bluetooth profile may refer to a specification regarding an aspect of Bluetooth-based wireless communications between devices. For example, a Bluetooth connection may be an extended synchronous connection orientated (eSCO) link for voice call (e.g., which may allow for retransmission), an asynchronous connection-less (ACL) link for music streaming (e.g., A2DP), etc.

For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., paired device 115-a) are acknowledged, and may be retransmitted if not acknowledged during a retransmission window. In addition, audio may be streamed between the device 110-a and paired device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some examples, the described techniques may be employed by devices capable of both Bluetooth and WLAN communications. In such cases, wireless communications system 100 may include an AP 105 and multiple associated devices 110. In some cases, the AP 105 and the associated devices 110 may represent a basic service set (BSS) or an extended service set (ESS), where the various devices 110 in the network are able to communicate with one another through the AP 105. In some examples, content, media, audio, etc. exchanged between a device 110 and a paired device 115 may originate from a WLAN. For example, in some cases, device 110-a may receive audio from an AP 105 (e.g., via WLAN communications), and the device 110-a may then implement the described techniques to relay or pass the audio to the paired device 115-a (e.g., via Bluetooth communications).

With wireless Bluetooth devices, such as headphones, becoming more predominant, improved high fidelity audio playback on Bluetooth headphones (e.g., such as paired devices 115) becomes of higher demand. To support high quality Bluetooth communications, it may be desirable to employ high bitrates for Bluetooth transmissions (e.g., high quality Bluetooth audio may demand high bitrates). Link conditions between two paired Bluetooth devices (e.g., between device 110-a and paired device 115-a) may have an impact on the data throughput (e.g., the audio bitrates) achievable while maintaining low tolerance for packet loss.

For example, poor link conditions, affected by noise, distance, interference, etc., may be associated with increased occurrence of information loss during wireless communications. In cases where link conditions are poor, wireless communications may employ reduced bitrates (e.g., which may be associated with reduced data throughput), as reduced bitrates may introduce redundant information bits, such that the information may be conveyed more robustly. For example, reduced bitrates that introduce redundancy into data transmissions may be more robust to some information loss due to poor link quality. In cases where link conditions are strong, higher bitrates may be used as the channel or link is less likely to be associated with loss of information.

In some examples, encoding schemes may not be updated in real time to account for varying link conditions. For example, Bluetooth codecs may include error resilience built in to reduce the effect of background noise (e.g., to account for link conditions). Such error resilience may come at a cost, however, as more robust codecs may be associated with lower audio bitrates. With higher quality codecs, audio information may be sent at higher bitrates. The present disclosure provides a solution or mechanism to detect link conditions and select audio bitrates based on the conditions such that these higher quality codecs may be commercially viable. That is, the described techniques may provide a mechanism for power efficient, dynamic adjustments of audio bitrates.

In some examples, the throughput associated with a Bluetooth link may vary (e.g., from as high as 1 Mbps to as low as 150 Kbps) depending on one or more factors (e.g., link quality, audio bitrate). With such variation in throughput, determining updated or adjusted bitrates may pose challenges due to the power consumption associated with encoding scheme modifications. Further, it may be desirable for the system to react to link conditions as quickly as possible to reduce the probability of glitches or other inefficiencies. The described techniques provide for a power optimized solution to determine the link bandwidth and pick a maximum bitrate the audio may be transmitted at (e.g., based on monitored link conditions). Further, the described techniques may provide for direct signaling between a Bluetooth chip (e.g., a Bluetooth component) and an encoding block (e.g., and encoding block of a DSP component) such that encoding scheme modifications may be performed more quickly.

Device 110-a and/or paired device 115-a may employ signaling and feedback mechanisms such that the Bluetooth firmware (e.g., associated with a Bluetooth component) may evaluate link quality and feedback link condition parameters to an audio DSP (e.g., a DSP component), such that the encoding scheme may be adjusted by the audio DSP dynamically. Encoding scheme modifications may include or refer to audio bitrate modifications, codec modifications, etc., and may be determined by the Bluetooth component, DSP component, or both, as described herein. Such a feedback mechanism involving operations performed by, and direct signaling between, the Bluetooth firmware and the audio DSP may thus be implemented without further involvement (e.g., from a host device). As such, delays in getting feedback information to the audio DSP may be reduced (e.g., as link condition information may not be routed through other hardware), unnecessary wakeup of the application processor may be reduced (e.g., which may result in power consumption savings), etc.

For example, a DSP component of device 110-a may signal one or more packets, encoded according to a first audio bitrate, to a Bluetooth component of device 110-a. The Bluetooth component of device 110-a may transmit the one or more packets (e.g., encoded according to the first audio bitrate) to paired device 115-a (e.g., a second Bluetooth device that the device 110-a is paired with). The Bluetooth component of device 110-a may further monitor the link condition between the device 110-a and the paired device 115-a, and may signal one or more link condition parameters to the DSP component of device 110-a based on the link condition sensing.

In some cases, the Bluetooth component of device 110-a may determine an adjusted audio bitrate, and the link quality feedback (e.g., the link condition parameters) may include an adjusted audio bitrate. Additionally or alternatively, link condition parameters signaled from the Bluetooth component of device 110-a to the DSP component of device 110-a may include one or more other parameters indicative of the link condition (e.g., such as a throughput parameter, a Bluetooth connect (BTC) condition, a flow stop parameter, a static multi-link condition). In such cases, the DSP component of device 110-a may determine an adjusted audio bitrate, or modify the adjusted audio bitrate indicated by the Bluetooth component of device 110-a, based on received link condition parameters.

In some cases, the link condition parameters may be sent from the Bluetooth component of device 110-a to the DSP component of device 110-a while an applications processor of device 110-a (or other processor in communication with the DSP) is operating in a low power or sleep mode. The DSP component of device 110-a may then signal one or more packets, encoded according to the adjusted audio bitrate, to the Bluetooth component of device 110-a. Device 110-a (e.g., Bluetooth component of device 110-a) may transmit the one or more packets (e.g., encoded according to the adjusted audio bitrate) to the paired device 115-a.

Figure 2:
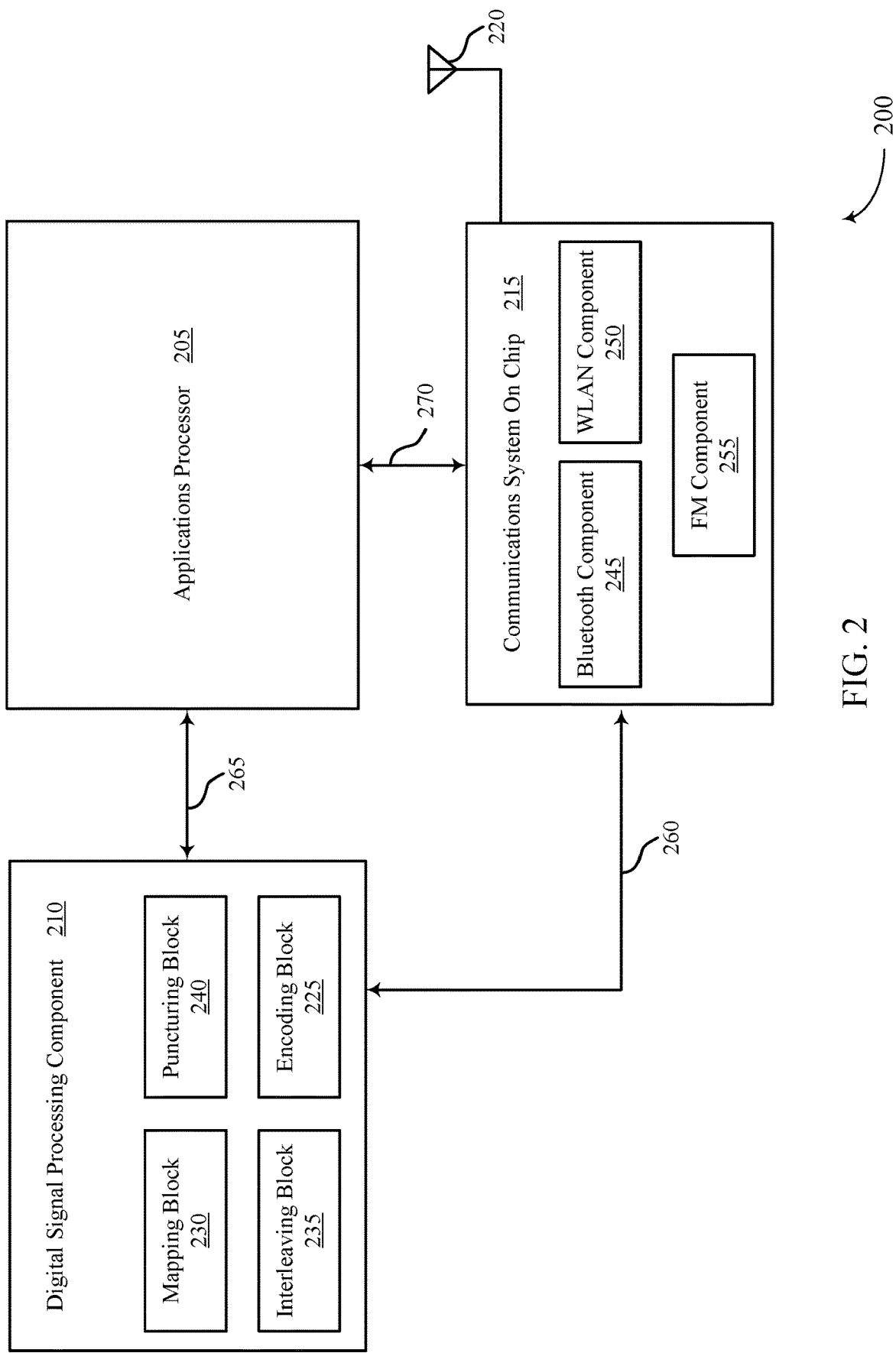
FIG. 2 shows a block diagram of a device that supports power optimized link quality detection and feedback in accordance with aspects of the present disclosure.

FIG. 2 illustrates an example block diagram 200 of a device (e.g., which may be an example of a device 110 or a device 505, as described herein) that supports power optimized link quality detection and feedback in accordance with aspects of the present disclosure. In some examples, block diagram 200 may implement aspects of wireless communications system 100. The device illustrated by block diagram 200 may include an applications processor 205, a DSP component 210, a communications system on chip (SoC) 215, and an antenna 220. Each of these components may be in communication with one another (e.g., via one or more buses or links, such as link 260, link 265, and link 270).

An applications processor 205 may be or include an intelligent hardware device, (e.g., a general-purpose processor, a CPU, a microcontroller, an ASIC, an FPGA, a programmable logic device, a discrete gate or transistor logic component, a discrete hardware component, or any combination thereof). In some cases, applications processor 205 may be configured to execute computer-readable instructions stored in a memory to perform various functions (e.g., functions or tasks supporting applications, aspects of DSP, aspects of Bluetooth communication). In some cases, applications processor 205 may refer to a host. In some cases, applications processor 205 may consume more power relative to DSP component 210 and SoC 215.

DSP component 210 may include suitable logic, circuitry and/or code that may perform DSP. For example, DSP component may include an encoding block 225, a mapping block 230, a puncturing block 240, and an interleaving block 235, each of which may perform aspects of DSP operations performed by a device. Other configurations of a DSP component 210 are contemplated, without departing from the scope of the present disclosure (e.g., DSP component 210 may include additional subcomponents, DSP component 210 may include a subset of the illustrated subcomponents). Each subcomponent of DSP component 210 may include suitable logic, circuitry and/or code to perform their respective functions.

SoC 215 may include suitable logic, circuitry and/or code that may, for example, control or coordinate communications associated with different communication protocols. For example, SoC 215 may include Bluetooth component 245 (e.g., a Bluetooth chip), WLAN component 250, and FM component 255. In some cases, Bluetooth and WLAN in the 2.4 GHz industrial, scientific and medical (ISM) band may share the same unlicensed frequency medium. In some cases, the SoC 215 may coordinate Bluetooth component 245, WLAN component 250, and FM component 255 for avoiding interference in domains such as frequency, power, and time (e.g., as in some cases, Bluetooth component 245, WLAN component 250, and FM component 255 may share the same antenna 220). Frequency domain techniques may include adaptive frequency hopping (AFH), and power domain techniques may include power back-off or de-boosting. Time domain techniques may include some form of frame alignment.

In some cases, the device may include a single antenna 220. However, in some cases the device may have more than one antenna 220, which may be capable of concurrently and/or simultaneously transmitting or receiving multiple wireless transmissions. In some examples, a device may include a transceiver that may communicate bi-directionally, via one or more antennas 220, wired, or wireless links as described above. For example, a transceiver may represent a wireless transceiver and may communicate bi-directionally with another wireless transceiver (e.g., of a paired device). The transceiver may also include a modem to modulate the packets and provide the modulated packets to the antennas 220 for transmission, and to demodulate packets received from the antennas 220.

In accordance with aspects of the present disclosure, information (e.g., data, audio) to be sent to a paired device (e.g., such as a Bluetooth headset) may be encoded at the DSP 210 (e.g., at the encoding block 225). The encoded data may be signaled (e.g., passed or sent across) to Bluetooth component 245 via link 260, and the Bluetooth component 245 may transmit the encoded data to the paired device (e.g., via antenna 220).

In some cases, the applications processor 205 may control aspects of the DSP component 210 (e.g., in some cases, some subcomponents of DSP component 210 may be implemented at applications processor 205, or applications processor 205 may control other aspects of DSP component 210). For example, in some cases, applications processor 205 may indicate an encoding scheme (e.g., an audio bitrate) to the DSP component 210 (e.g., via link 265), and the DSP component 210 may encode data via encoding block 225 according to the indicated encoding scheme. As described herein, however, in some cases operation of applications processor 205 may be costly in terms of power consumption. As such, the device may support the described power optimized link quality detection and feedback techniques, which may relate to Bluetooth firmware.

For example, the Bluetooth component 245 may monitor link conditions (e.g., determine link quality or a link condition) between the device and the paired device. The link condition information may be sensed by the Bluetooth component 245, and may be passed (e.g., directly) to the DSP component 210 via link 260. In some cases, the link condition information (e.g., one or more link condition parameters) may be signaled directly to the encoding block 225. For example, the direct signaling of link condition information from the Bluetooth component 245 to the DSP component 210 (e.g., or the encoding block 225) may alleviate the need to power other components of the device to process or pass on the link condition information. That is, as the link condition parameters may be passed or communicated directly between the Bluetooth component 245 and the DSP component 210, the applications processor 205 and other components may remain in a low power or sleep state.

Table 1 below may illustrate aspects of link condition sensing and link condition parameter information. For example, Bluetooth component 245 may detect or monitor for conditions shown in the middle and right columns of Table 1 (Criteria for increasing link Quality). In some examples, DSP component 210 may use such information to determine an encoding scheme (e.g., determine an audio bitrate), and may indicate the selected audio bitrate to the DSP component 210 via a link condition parameter (e.g., in some cases the link condition parameter may comprise and adjusted audio bitrate, determined by the Bluetooth component 245 based on sensed link conditions).

For example, Table 1 may show and example thresholds or criteria for increasing and lowering encoding schemes for different Quality Levels. In some cases, a Quality Level may refer to some set link quality requirements or system needs (e.g., such as quality requirements for different Bluetooth profiles). For example, high definition (HD) Bluetooth audio may be sensitive to interruptions or audio glitches, and may demand higher quality levels to ensure delay sensitive traffic is delivered effectively. In cases where a Bluetooth link is associated with a link quality Level 4, for example, column 2 may show the thresholds or criteria for reducing the encoding scheme (e.g., or reducing the quality level), and column 3 may show the thresholds or criteria for increasing the encoding scheme (e.g., or increasing the quality level). In the example of link quality Level 4, if the Average Latency for A2DP packet is >40 msec, the encoding scheme may be reduced. If Average Latency for A2DP packet is <30 msec, in some cases, the encoding scheme may be increased.

Additionally or alternatively, Bluetooth component 245 may indicate parameters more explicitly indicating the link quality to the DSP component 210. For example, Bluetooth component 245 may indicate a throughput parameter, a Bluetooth connect (BTC) condition, a flow stop parameter, a static multi-link condition, or some combination thereof, to DSP component 210 (e.g., via link condition parameters indicated over link 260). In such cases, DSP component 210 may determine or adjust the audio bitrate based on the received link condition parameters.

TABLE 1

| Quality Level | Criteria for lowering link Quality | Criteria for increasing link Quality |
|---|---|---|
| Level 1 - Ultra low quality | → Lowest quality | Throughput: Average Latency for A2DP packet is (200 msec default) <70 msec AND Static Multi link condition: Number of HID/BLE links <=3 (with connection interval <=25 msec) |

TABLE 1-continued

| Quality Level | Criteria for lowering link Quality | Criteria for increasing link Quality |
|---|---|---|
| | | AND<br>BTC condition: Duration of denials per packet is not exceeding 30 msec.<br>AND<br>Flow Stop: Time spent waiting for FLOW ON <50 msec |
| Level 2 - Low quality | Throughput: Average Latency for A2DP packet is (200 msec default) >60 msec<br>OR<br>Static Multi link condition: Number of HID/BLE links >3 (with connection interval <=25 msec)<br>OR<br>BTC condition: Duration of denials per packet is exceeding 30 msec.<br>OR<br>Flow Stop: Time spent waiting for FLOW ON >50 msec | Throughput: Average Latency for A2DP packet is (200 msec default) <50 msec<br>AND<br>Static Multi link condition: Number of HID/BLE links <=2 (with connection interval <=25 msec)<br>AND<br>BTC condition: Duration of denials per packet is not exceeding 25 msec.<br>AND<br>Flow Stop: Time spent waiting for FLOW ON <25 msec |
| Level 3 - Medium quality | Throughput: Average Latency for A2DP packet is (200 msec default) >50 msec<br>OR<br>Static Multi link condition: Number of HID/BLE links >=2 (with connection interval <=25 msec)<br>OR<br>BTC condition: Duration of denials per packet is exceeding 25 msec.<br>OR<br>Flow Stop: Time spent waiting for FLOW ON >=25 msec | Throughput: Average Latency for A2DP packet is (200 msec default) <40 msec<br>AND<br>Static Multi link condition: Number of HID/BLE links <=1 (with connection interval <=25 msec)<br>AND<br>BTC condition: Duration of denials per packet is not exceeding 15 msec.<br>AND<br>Flow Stop: Time spent waiting for FLOW ON <10 msec |
| Level 4 - High quality | Throughput: Average Latency for A2DP packet is (200 msec default) >40 msec<br>OR<br>Static Multi link condition: Number of HID/BLE links >=1 (with connection interval <=25 msec)<br>OR<br>BTC condition: Duration of denials per packet is exceeding 15 msec.<br>OR<br>Flow Stop: Time spent waiting for FLOW ON >10 msec | Throughput: Average Latency for A2DP packet is (200 msec default) <30 msec<br>AND<br>Static Multi link condition: Number of HID/BLE links is ZERO (with connection interval <=25 msec)<br>AND<br>BTC condition: Duration of denials per packet is not exceeding 10 msec.<br>AND<br>Flow Stop: No Flow Stop at all in the evaluation interval |
| Level 5 - Ultra high quality<br>Expectation to support 1 Mbps data rate for A2DP link | Throughput: Average Latency for A2DP packet is (200 msec default) >30 msec<br>OR<br>Static Multi link condition: Number of HID/BLE links is > ZERO (with connection interval <=25 msec)<br>OR<br>BTC condition: Duration of denials per packet is exceeding 10 msec.<br>OR<br>Flow Stop: Any Flow Stop from remote | → Max limit |

Figure 3:
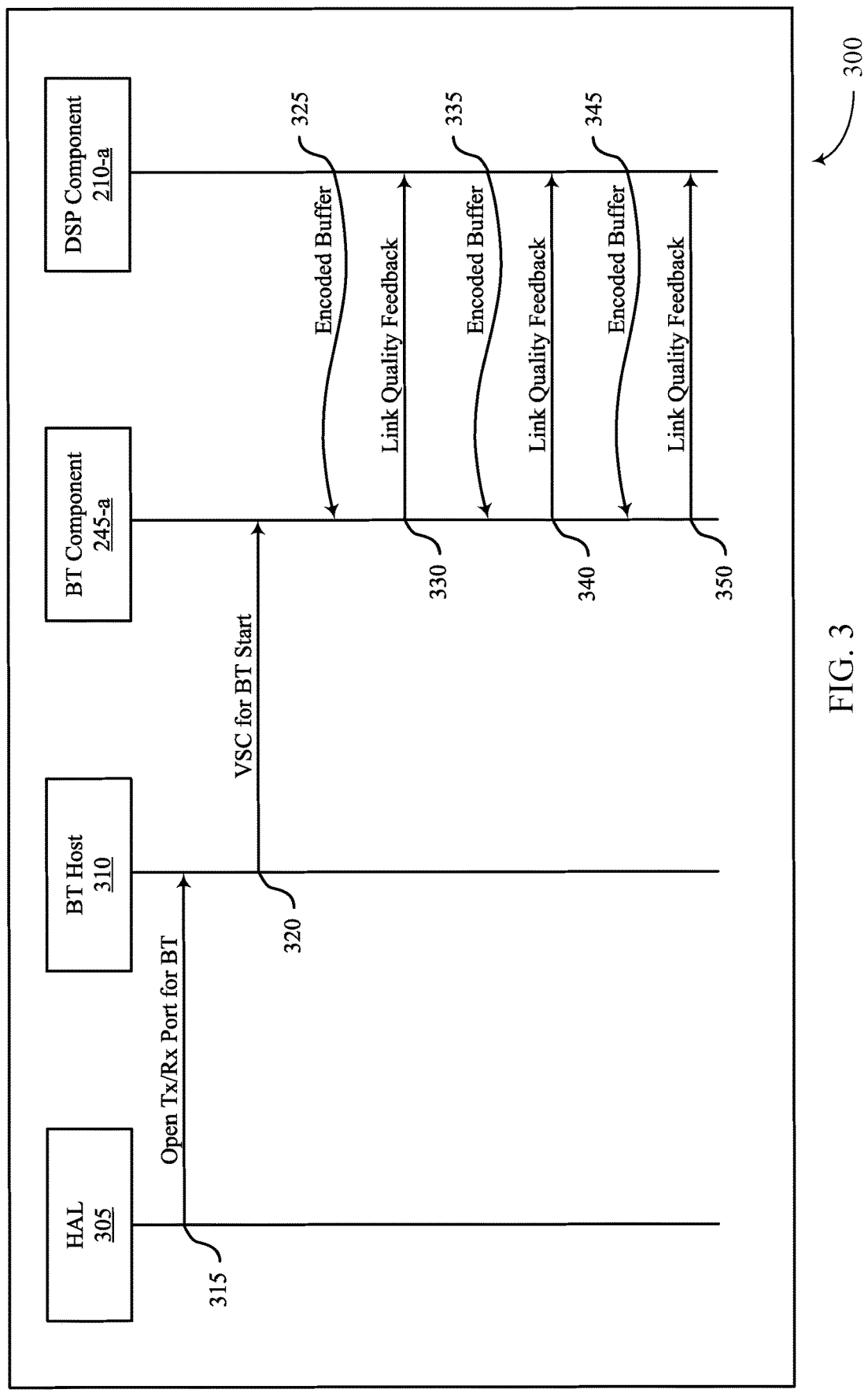
FIG. 3 illustrates an example of a process flow that supports power optimized link quality detection and feedback in accordance with aspects of the present disclosure.

FIG. 3 illustrates an example of a process flow 300 that supports power optimized link quality detection and feedback in accordance with aspects of the present disclosure. In some examples, process flow 300 may implement aspects of wireless communications system 100. Process flow 300 may illustrate operations within a device 110 (e.g., which may include hardware abstraction layer (HAL) 305, BT host 310, DSP component 210-a, and Bluetooth (BT) component 245-a) for adjusting encoding schemes (e.g., audio bitrates) based on link quality associated with communications with a paired device. In the following description of the process flow 300, the passing of information between the HAL 305, the BT host 310, the DSP component 210-a, and the BT component 245-a may be performed in a different order than the exemplary order shown, or the operations performed by HAL 305, BT host 310, DSP component 210-a, and BT component 245-a may be performed in different orders or at different times. In some cases, certain operations may also be omitted from the process flow 300, or other operations may be added to the process flow 300.

At 315, HAL 305 may indicate or configure BT host 310 to open one or more transmission/reception ports for Bluetooth communication. In some cases, HAL 305 may refer to upper stack that may include or refer to suitable logic, circuitry and/or code that may be enabled to implement higher level protocols and transfer the technology specific application information.

At 320, BT host 310 may signal or indicate a vendor specific command (VSC) to initiate communication (e.g., Bluetooth communication). For example, in some cases, BT host 310 may include suitable logic, circuitry and/or code that may convert data such as GPS data, FM data, cellular data, audio data, etc. to a Bluetooth host controller interface (HCI) packet format by using VSCs. The signaling (e.g., or passing) between components may refer to communication of information across wired and/or wireless links or electrical connections between components where signals or information may be signaled, passed, or communicated amongst the components.

At 325, DSP component 210-a may signal one or more packets (e.g., encoded according to some audio bitrate) to BT component 245-a. For example, DSP component 210-a may signal (e.g., pass) an encoded buffer that includes one or more encoded packets to BT component 245-a. In some cases, 325 may illustrate a BSR signaled from DSP component 210-a to BT component 245-a.

At 330, BT component 245-a may signal link quality feedback (e.g., link quality feedback associated with a link between the device and a paired device) to DSP component 210-a. In some cases, the link quality feedback may include one or more link condition parameters indicating an encoding scheme or audio bitrate to be implemented by the DSP component 210-a (e.g., the link quality feedback may comprise a link condition parameter indicating an adjusted audio bitrate). Additionally or alternatively, the link quality feedback may include one or more link condition parameters indicating a throughput condition, a static multilink condition, a BTC condition, a flow stop condition, or some combination thereof (e.g., such that the DSP component 210-a may use the link quality feedback for DSP decisions, such as audio bitrate adjustment).

The DSP component 210-a may adjust an encoding scheme (e.g., an audio bitrate) based on the link quality feedback. For example, DSP component 210-a may adjust an audio bitrate according to an audio bitrate indicated by BT component 245-a, or may itself determine an audio bitrate adjustment based on link condition parameters indicated by BT component 245-a, as discussed in more detail with reference to FIG. 4.

The processes illustrated from 325 through 330 may be repeated from 335 through 350, such that the device may continue to adjust the audio bitrate for Bluetooth communications in accordance with the described techniques. For example, the processes illustrated from 325 through 350 may provide for signaling between the BT component 245-a and the DSP component 210-a for power efficient link condition sensing (e.g., by the BT component 245-a) and corresponding encoder bitrate modification (e.g., by the DSP component 210-a). In some cases, the described signaling between the BT component 245-a and the DSP component 210-a may reduce power consumption as the direct signaling may help alleviate the need to power other hardware components of the device (e.g., such as an applications processor of the device). For example, link condition sensing (e.g., link quality monitoring) and audio bitrate determination may be handled by the BT component 245-a and the DSP component 210-a, such that the applications processor may be operated in a low power or sleep state.

Figure 4:
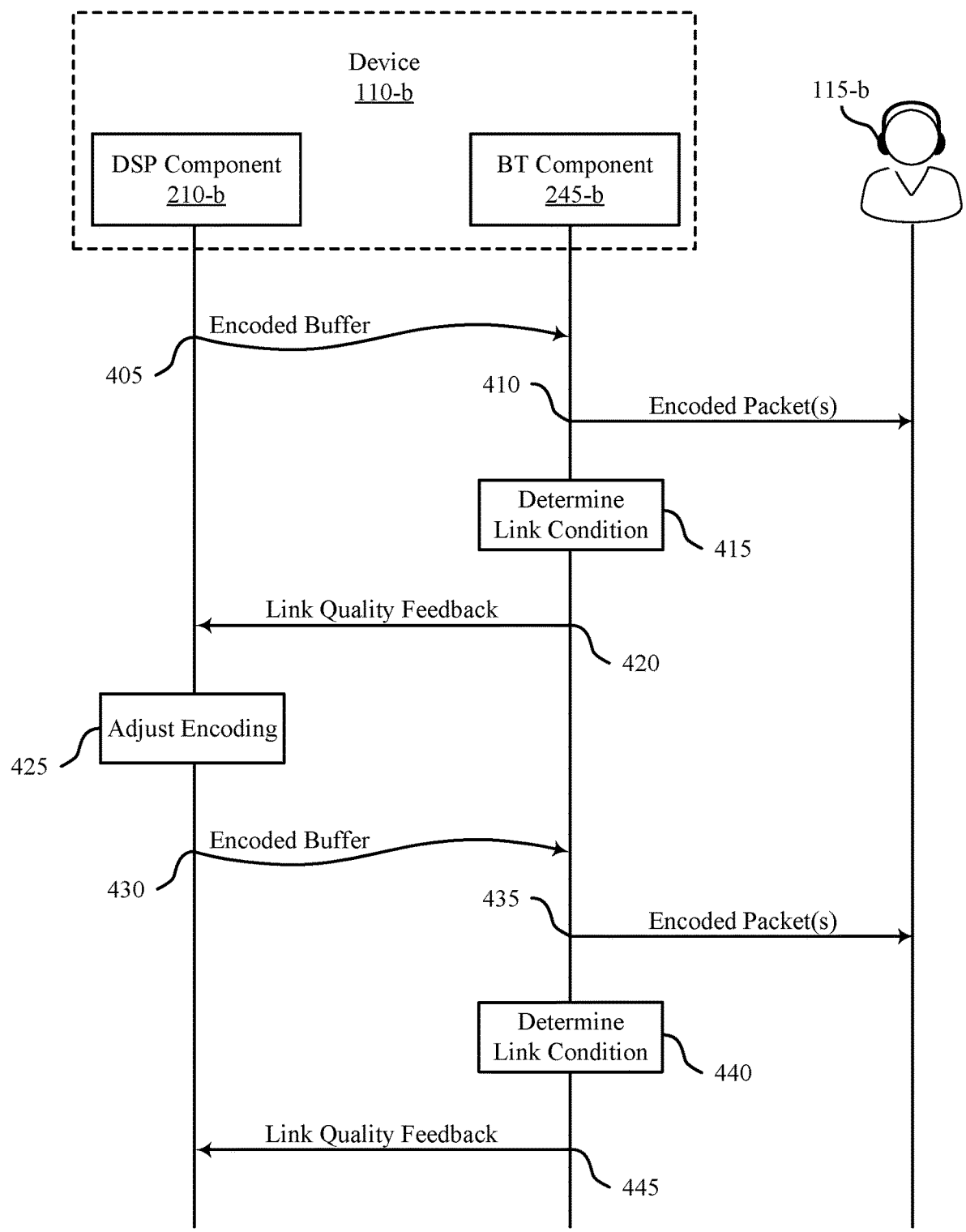
FIG. 4 illustrates an example of a process flow that supports power optimized link quality detection and feedback in accordance with aspects of the present disclosure.

FIG. 4 illustrates an example of a process flow 400 that supports power optimized link quality detection and feedback in accordance with aspects of the present disclosure. In some examples, process flow 400 may implement aspects of wireless communications system 100. Process flow 400 includes a device 110-b and a paired device 115-b, which may be examples of a device 110 and paired device 115 as described with reference to FIGS. 1, 2, and 3. Process flow 400 may illustrate a device 110-b (e.g., which may include DSP component 210-b and BT component 245-b) adjusting encoding schemes (e.g., audio bitrates) based on link quality associated with communications with paired device 115-b. In the following description of the process flow 400, the passing of information between the DSP component 210-b and the BT component 245-b may be performed in a different order than the exemplary order shown, or the operations performed by DSP component 210-b and BT component 245-b may be performed in different orders or at different times. In some cases, certain operations may also be left out of the process flow 400, or other operations may be added to the process flow 400.

At 405, DSP component 210-b may signal one or more packets encoded according to a first audio bitrate to BT component 245-b (e.g., DSP component 210-b may signal or pass an encoded buffer that includes the one or more packets encoded according to a first audio bitrate to BT component 245-b). In some cases, 405 may illustrate a BSR signaled from DSP component 210-b to BT component 245-b.

At 410, BT component 245-b may transmit the one or more packets encoded according to the first audio bitrate (e.g., identified or received at 405) to paired device 115-b.

At 415, BT component 245-b may determine a link condition based at least in part on the one or more packets transmitted at 410. For example, BT component 245-b may determine a throughput or average latency associated with the one or more packets transmitted at 410. Additionally or alternatively, BT component 245-b may determine a static multilink condition, a BTC condition, a flow stop condition, etc. associated with the link between the device 110-b (e.g., the BT component 245-b) and the paired device 115-b.

In some cases, determining a link condition may additionally refer to determining whether or that the link quality exceeds some threshold. For example, at 415, BT component 245-b may determine that a throughput condition, a static multilink condition, a BTC condition, a flow stop condition, or some combination thereof, indicates that the link quality is above or below some quality threshold (e.g., which may indicate the device 110-b should adjust the encoding scheme or audio bitrate). In some cases, in addition to determining a link condition discussed above, BT component 245-b may additionally determine an adjusted (e.g., a second) audio bitrate based on the determined static multilink condition, a BTC condition, a flow stop condition, etc., at 415.

At 420, BT component 245-b may signal a link condition parameter (e.g., link quality feedback) to DSP component 210-b. For example, the link quality feedback may include one or more link condition parameters indicating an encoding scheme or audio bitrate to be implemented by the DSP component 210-b (e.g., the link condition parameter may comprise an adjusted audio bitrate). Additionally or alternatively, the link quality feedback may include one or more link condition parameters indicating a throughput condition, a static multilink condition, a BTC condition, a flow stop condition, or some combination thereof (e.g., such that the DSP component 210-*b* may use the link quality feedback for DSP decisions, such as audio bitrate adjustment). In some cases, the link quality feedback may be signaled to an encoding block of the DSP component 210-*b*. In some cases, the link condition parameter may be signaled to the DSP component 210-*b* while an applications processor (e.g., of the device 110-*b*) is operating in a low power or sleep mode. That is, the link quality feedback may be signaled directly from BT component 245-*b* to the DSP component 210-*b* without passing through additional hardware or processing.

At 425, the DSP component 210-*b* may adjust the encoding scheme (e.g., adjust the audio bitrate) based on the link quality feedback received at 420. For example, incases where a link condition parameter received indicates an encoding scheme or audio bitrate to be implemented, the DSP component 210-*b* may adjust the encoding scheme or audio bitrate accordingly. In cases where the one or more link condition parameters indicate a throughput condition, a static multilink condition, a BTC condition, a flow stop condition, or some other link quality parameter, the DSP component 210-*b* may determine an encoding scheme adjustment based on the received link quality feedback.

For example, the DSP component 210-*b* may adjust the audio bitrate based on a link condition determined from the received link quality feedback. In some examples, the DSP component 210-*b* may determine an adjusted audio bitrate based on a status of an encoded audio buffer, among other parameters. For example, DSP component 210-*b* may adjust the audio bitrate based the link quality (e.g., determined or identified from link condition parameters received at 420) as well as based on the volume of encoded packets buffered at the DSP component 210-*b*.

At 430, DSP component 210-*b* may signal one or more packets encoded according to a second audio bitrate (e.g., the adjusted audio bitrate from 425) to BT component 245-*b* (e.g., DSP component 210-*b* may signal or pass an encoded buffer that includes the one or more packets encoded according to the second audio bitrate to BT component 245-*b*). In some cases, 430 may illustrate a BSR signaled from DSP component 210-*b* to BT component 245-*b* (e.g., which may reflect the adjusted bitrate).

At 435, BT component 245-*b* may transmit the one or more packets encoded according to the second audio bitrate (e.g., identified at 430) to paired device 115-*b*.

At 440, BT component 245-*b* may determine a link condition based at least in part on the one or more packets transmitted at 435. For example, BT component 245-*b* may determine a throughput or average latency associated with the one or more packets transmitted at 435. Additionally or alternatively, BT component 245-*b* may determine a static multilink condition, a BTC condition, a flow stop condition, etc. associated with the link between the device 110-*b* (e.g., the BT component 245-*b*) and the paired device 115-*b*.

In some cases, determining a link condition may additionally refer to determining that the link quality exceeds some threshold. For example, at 440, BT component 245-*b* may determine that a throughput condition, a static multilink condition, a BTC condition, a flow stop condition, or some combination thereof, indicates that the link quality is above or below some quality threshold (e.g., which may indicate the device 110-*b* should adjust the encoding scheme or audio bitrate). In some cases, in addition to determining a link condition discussed above, BT component 245-*b* may additionally determine an adjusted (e.g., a third) audio bitrate based on the determined static multilink condition, a BTC condition, a flow stop condition, etc., at 440.

At 445, BT component 245-*b* may signal a link condition parameter (e.g., link quality feedback) to DSP component 210-*b*. For example, the link quality feedback may include one or more link condition parameters indicating an encoding scheme or audio bitrate to be implemented by the DSP component 210-*b*, a throughput condition, a static multilink condition, a BTC condition, a flow stop condition, or some combination thereof.

Figure 5:
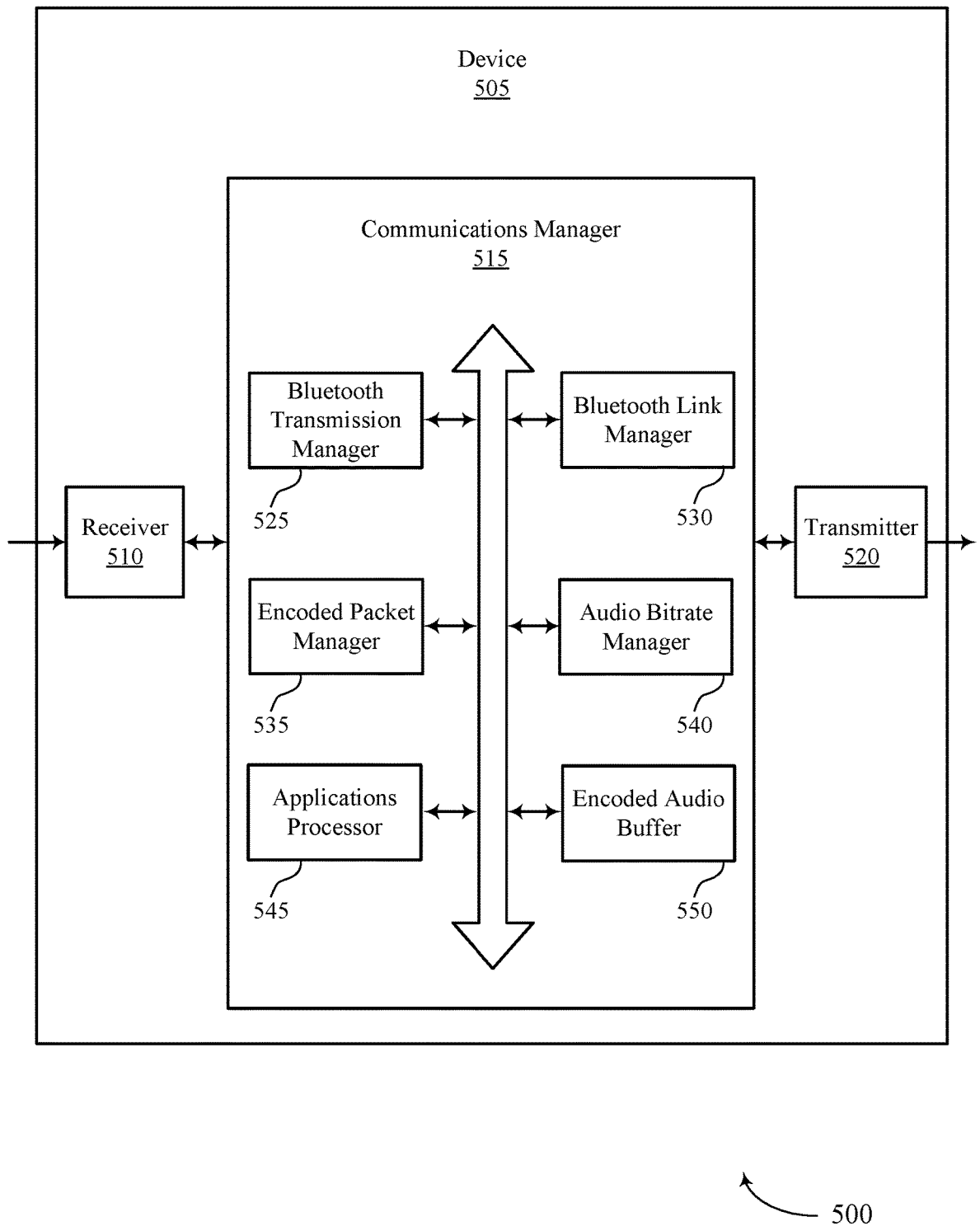
FIG. 5 shows a block diagram of a device that supports power optimized link quality detection and feedback in accordance with aspects of the present disclosure.

FIG. 5 shows a block diagram 500 of a device 505 that supports power optimized link quality detection and feedback in accordance with aspects of the present disclosure. The device 505 may be an example of aspects of a device 110 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to power optimized Bluetooth firmware link quality detection and feedback). Information may be passed on to other components of the device. The receiver 510 may be an example of aspects of the transceiver 620 described with reference to FIG. 6. The receiver 510 may utilize a single antenna or a set of antennas.

The communications manager 515 may transmit one or more packets encoded according to a first audio bitrate to a second device, transmit one or more packets encoded according to the second audio bitrate to the second device, determine a link condition based at least in part the transmitting, signal a link condition parameter to a DSP, and signal, to a Bluetooth component, one or more packets encoded according to a second audio bitrate that is based on the link condition parameter.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 515 may be an example of aspects of the communications manager 515 as described herein. The communications manager 515 may include a Bluetooth transmission manager 525, a Bluetooth link manager 530, and an encoded packet manager 535.

The Bluetooth transmission manager 525 may transmit one or more packets encoded according to a first audio bitrate to a second device. After any encoding scheme adjustments, the Bluetooth transmission manager 525 may transmit one or more packets encoded according to the second audio bitrate (e.g., the adjusted audio bitrate) to the second device.

The Bluetooth link manager 530 may determine a link condition based at least in part the transmitting and signal the link condition parameter to a DSP. In some examples, the Bluetooth link manager 530 may signal the link condition parameter from the Bluetooth component to the DSP while an applications processor is operating in a low power mode. In some examples, the Bluetooth link manager 530 may determine that the link condition is below a threshold. In some examples, the Bluetooth link manager 530 may determine that the link condition is above a threshold.

The encoded packet manager 535 may signal, to a Bluetooth component (e.g., Bluetooth transmission manager 525), one or more packets encoded according to a second audio bitrate that is based on the link condition parameter. In some examples, the encoded packet manager 535 may signal one or more packets encoded according to the first audio bitrate to the Bluetooth component.

The audio bitrate manager 540 may select the second audio bitrate for a Bluetooth communication to be performed based on the link condition, where the link condition parameter includes the second audio bitrate. In some examples, the second audio bitrate for a Bluetooth communication to be performed may be selected based on the link condition parameter, where the link condition parameter includes a throughput parameter, a BTC condition, a flow stop parameter, a static multi-link condition, or some combination thereof. In some examples, the audio bitrate manager 540 may signal the link condition parameter to an encoding block of the DSP. In some examples, the audio bitrate manager 540 may select the second audio bitrate based on the determination, where the second audio bitrate is less than the first audio bitrate. In some examples, the audio bitrate manager 540 may select the second audio bitrate based on the determination, where the second audio bitrate is greater than the first audio bitrate.

In some examples, the audio bitrate manager 540 may signal the link condition parameter to the applications processor 545, and the applications processor 545 may signal the link condition parameter to the DSP. However, as discussed above, in some cases the Bluetooth link manager 530 may signal the link condition parameter from the Bluetooth component directly to the DSP while an applications processor 545 is operating in a low power mode.

The encoded audio buffer 550 may determine that a status of an encoded audio buffer satisfies a second threshold, where the second audio bitrate is further selected based on determining that the status of the encoded audio buffer satisfies the threshold.

Transmitter 520 may transmit signals generated by other components of the device. In some examples, the transmitter 520 may be collocated with a receiver 510 in a transceiver module. For example, the transmitter 520 may be an example of aspects of the transceiver 620 described with reference to FIG. 6. The transmitter 520 may utilize a single antenna or a set of antennas.

Figure 6:
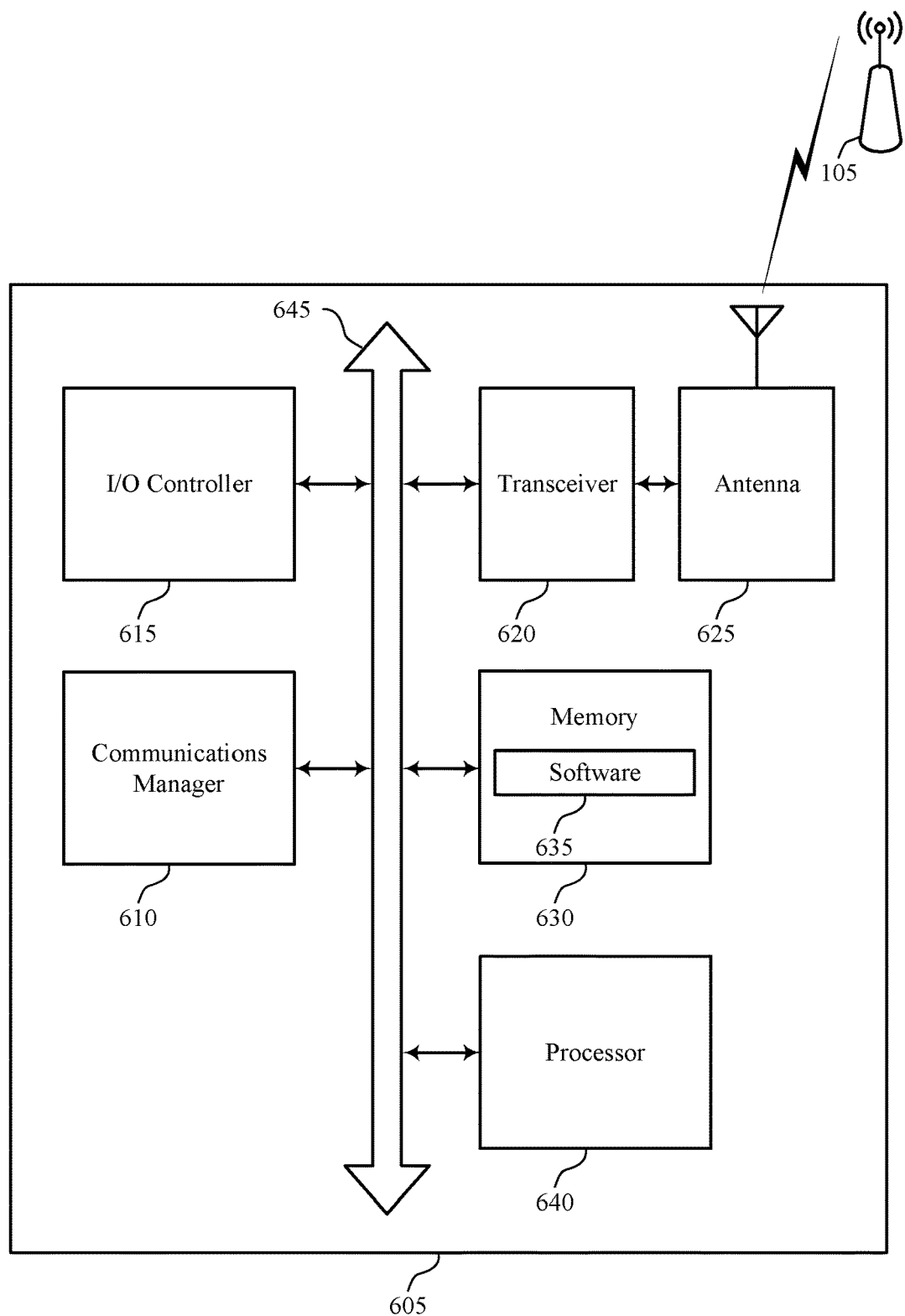
FIG. 6 shows a diagram of a system including a device that supports power optimized link quality detection and feedback in accordance with aspects of the present disclosure.

FIG. 6 shows a diagram of a system 600 including a device 605 that supports power optimized link quality detection and feedback in accordance with aspects of the present disclosure. The device 605 may be an example of or include the components of device 505 or a device as described herein. The device 605 may include components for bi-directional voice and data communications including components for transmitting and receiving communications, including a communications manager 610, an I/O controller 615, a transceiver 620, an antenna 625, memory 630, and a processor 640. These components may be in electronic communication via one or more buses (e.g., bus 645).

The communications manager 610 may transmit, by a Bluetooth component to a second device, one or more packets encoded according to a first audio bitrate, transmit, by the Bluetooth component to the second device, one or more packets encoded according to the second audio bitrate, determine, at the Bluetooth component, a link condition based at least in part the transmitting, signal, from the Bluetooth component to a DSP, a link condition parameter, and signal, from the DSP to the Bluetooth component, one or more packets encoded according to a second audio bitrate that is based on the link condition parameter.

I/O controller 615 may manage input and output signals for device 605. I/O controller 615 may also manage peripherals not integrated into device 605. In some cases, I/O controller 615 may represent a physical connection or port to an external peripheral. In some cases, I/O controller 615 may utilize an operating system such as iOS®, ANDROID®, MS-DOS®, MS-WINDOWS®, OS/2®, UNIX®, LINUX®, or another known operating system. In other cases, I/O controller 615 may represent or interact with a modem, a keyboard, a mouse, a touchscreen, or a similar device. In some cases, I/O controller 615 may be implemented as part of a processor. In some cases, a user may interact with device 605 via I/O controller 615 or via hardware components controlled by I/O controller 615.

Transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

Memory 630 may include RAM and ROM. The memory 630 may store computer-readable, computer-executable software 635 including instructions that, when executed, cause the processor to perform various functions described herein. In some cases, the memory 630 may contain, among other things, a BIOS which may control basic hardware or software operation such as the interaction with peripheral components or devices.

Processor 640 may include an intelligent hardware device, (e.g., a general-purpose processor, a CPU, a microcontroller, an ASIC, an FPGA, a programmable logic device, a discrete gate or transistor logic component, a discrete hardware component, or any combination thereof). In some cases, processor 640 may be configured to operate a memory array using a memory controller. In other cases, a memory controller may be integrated into processor 640. Processor 640 may be configured to execute computer-readable instructions stored in a memory to perform various functions (e.g., functions or tasks supporting power optimized Bluetooth firmware link quality detection and feedback).

Figure 7:
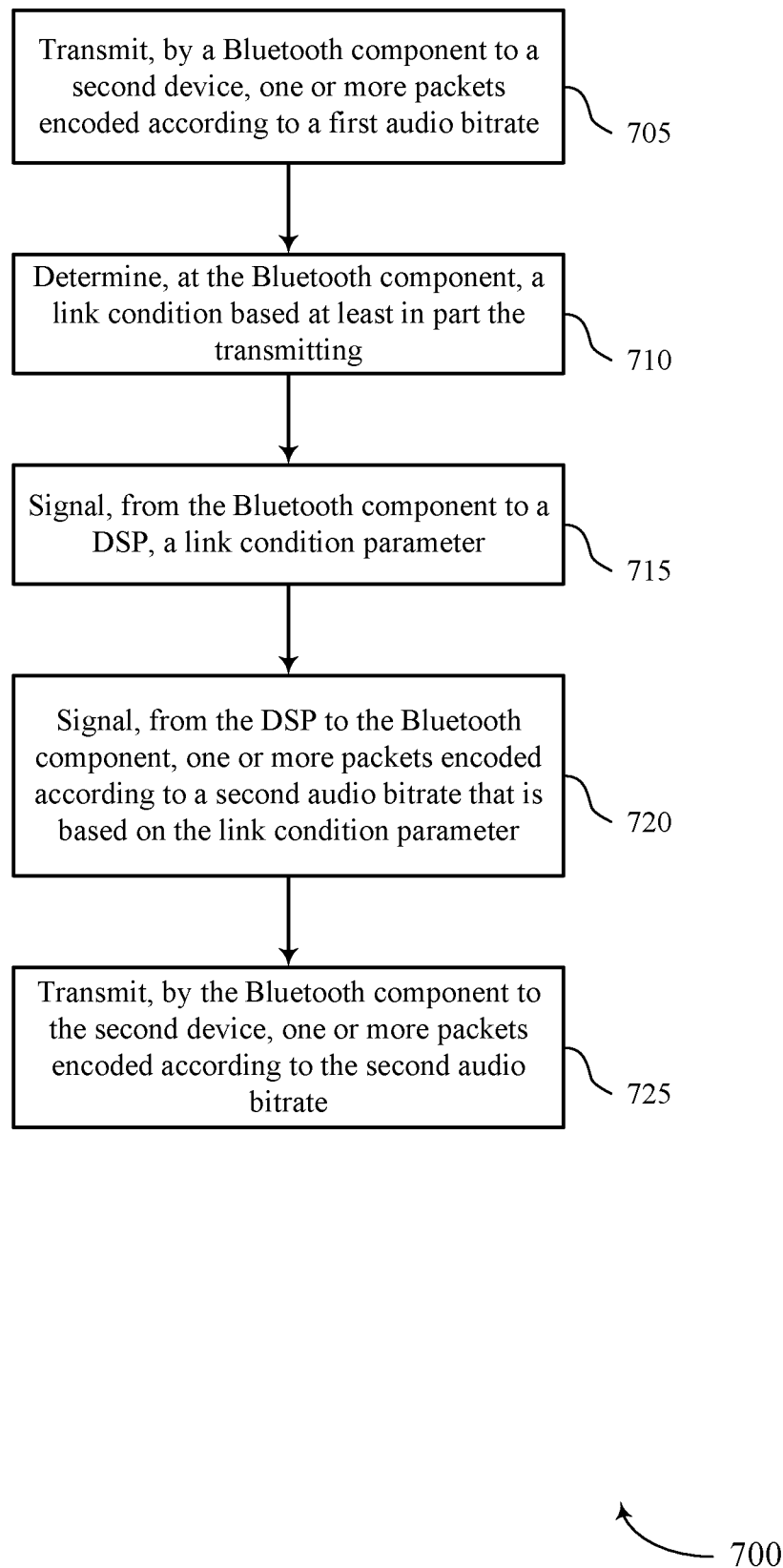
FIGS. 7 through 9 show flowcharts illustrating methods that support power optimized link quality detection and feedback in accordance with aspects of the present disclosure.

FIG. 7 shows a flowchart illustrating a method 700 that supports power optimized link quality detection and feedback in accordance with aspects of the present disclosure. The operations of method 700 may be implemented by a device or its components as described herein. For example, the operations of method 700 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 705, the device may transmit, by a Bluetooth component to a second device, one or more packets encoded according to a first audio bitrate. The operations of 705 may be performed according to the methods described herein. In some examples, aspects of the operations of 705 may be performed by a Bluetooth transmission manager as described with reference to FIGS. 5 through 6.

At 710, the device may determine, at the Bluetooth component, a link condition based at least in part the transmitting. The operations of 710 may be performed according to the methods described herein. In some examples, aspects of the operations of 710 may be performed by a Bluetooth link manager as described with reference to FIGS. 5 through 6.

At 715, the device may signal, from the Bluetooth component to a DSP, a link condition parameter. The operations of 715 may be performed according to the methods described herein. In some examples, aspects of the operations of 715 may be performed by a Bluetooth link manager as described with reference to FIGS. 5 through 6.

At 720, the device may signal, from the DSP to the Bluetooth component, one or more packets encoded according to a second audio bitrate that is based on the link condition parameter. The operations of 720 may be performed according to the methods described herein. In some examples, aspects of the operations of 720 may be performed by an encoded packet manager as described with reference to FIGS. 5 through 6.

At 725, the device may transmit, by the Bluetooth component to the second device, one or more packets encoded according to the second audio bitrate. The operations of 725 may be performed according to the methods described herein. In some examples, aspects of the operations of 725 may be performed by a Bluetooth transmission manager as described with reference to FIGS. 5 through 6.

Figure 8:
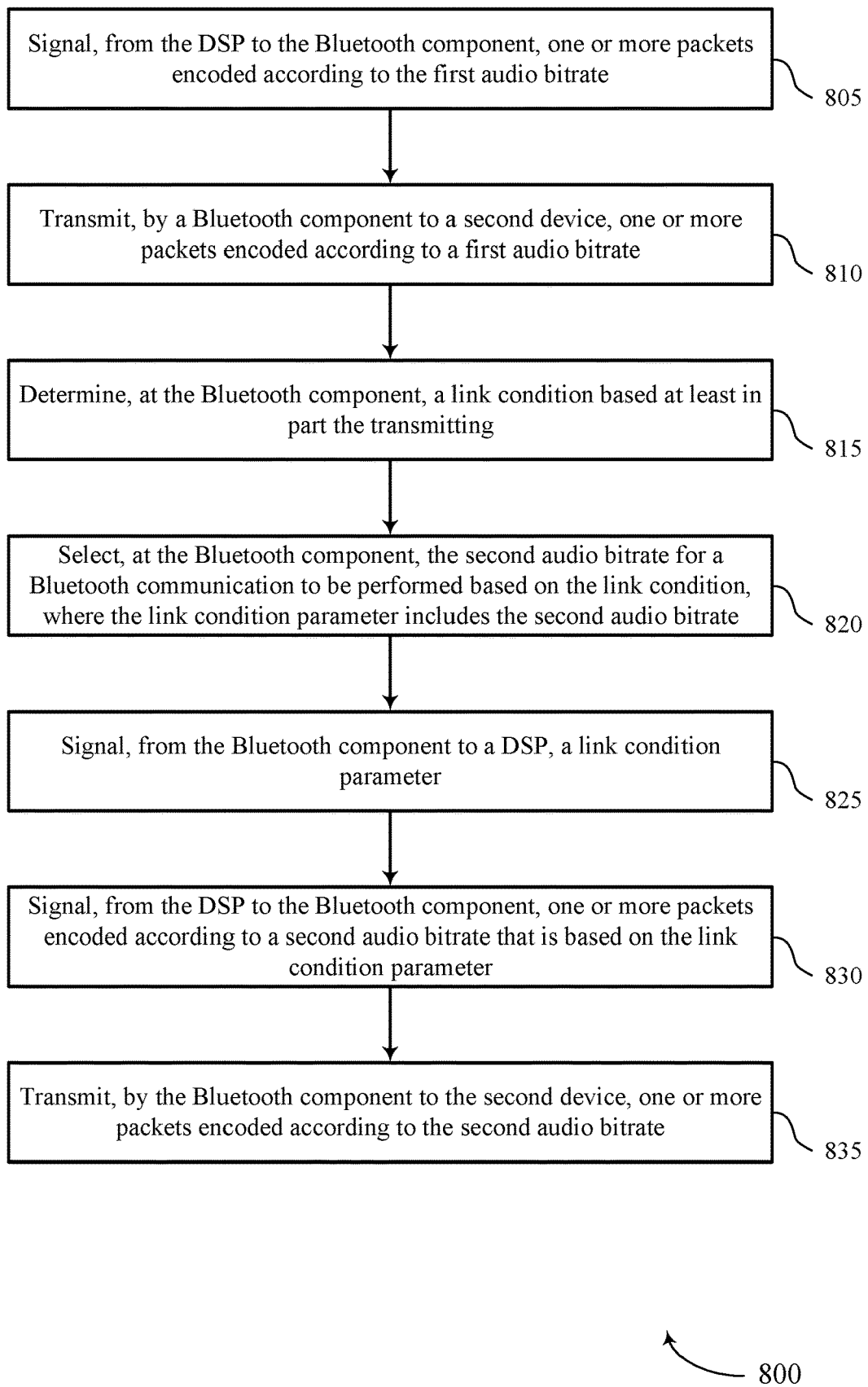

FIG. 8 shows a flowchart illustrating a method 800 that supports power optimized link quality detection and feedback in accordance with aspects of the present disclosure. The operations of method 800 may be implemented by a device or its components as described herein. For example, the operations of method 800 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 805, the device may signal, from the DSP to the Bluetooth component, one or more packets encoded according to the first audio bitrate. The operations of 805 may be performed according to the methods described herein. In some examples, aspects of the operations of 805 may be performed by an encoded packet manager as described with reference to FIGS. 5 through 6.

At 810, the device may transmit, by a Bluetooth component to a second device, one or more packets encoded according to a first audio bitrate. The operations of 810 may be performed according to the methods described herein. In some examples, aspects of the operations of 810 may be performed by a Bluetooth transmission manager as described with reference to FIGS. 5 through 6.

At 815, the device may determine, at the Bluetooth component, a link condition based at least in part the transmitting. The operations of 815 may be performed according to the methods described herein. In some examples, aspects of the operations of 815 may be performed by a Bluetooth link manager as described with reference to FIGS. 5 through 6.

At 820, the device may select, at the Bluetooth component, the second audio bitrate for a Bluetooth communication to be performed based on the link condition, where the link condition parameter includes the second audio bitrate. The operations of 820 may be performed according to the methods described herein. In some examples, aspects of the operations of 820 may be performed by an audio bitrate manager as described with reference to FIGS. 5 through 6.

At 825, the device may signal, from the Bluetooth component to a DSP, a link condition parameter. The operations of 825 may be performed according to the methods described herein. In some examples, aspects of the operations of 825 may be performed by a Bluetooth link manager as described with reference to FIGS. 5 through 6.

At 830, the device may signal, from the DSP to the Bluetooth component, one or more packets encoded according to a second audio bitrate that is based on the link condition parameter. The operations of 830 may be performed according to the methods described herein. In some examples, aspects of the operations of 830 may be performed by an encoded packet manager as described with reference to FIGS. 5 through 6.

At 835, the device may transmit, by the Bluetooth component to the second device, one or more packets encoded according to the second audio bitrate. The operations of 835 may be performed according to the methods described herein. In some examples, aspects of the operations of 835 may be performed by a Bluetooth transmission manager as described with reference to FIGS. 5 through 6.

Figure 9:
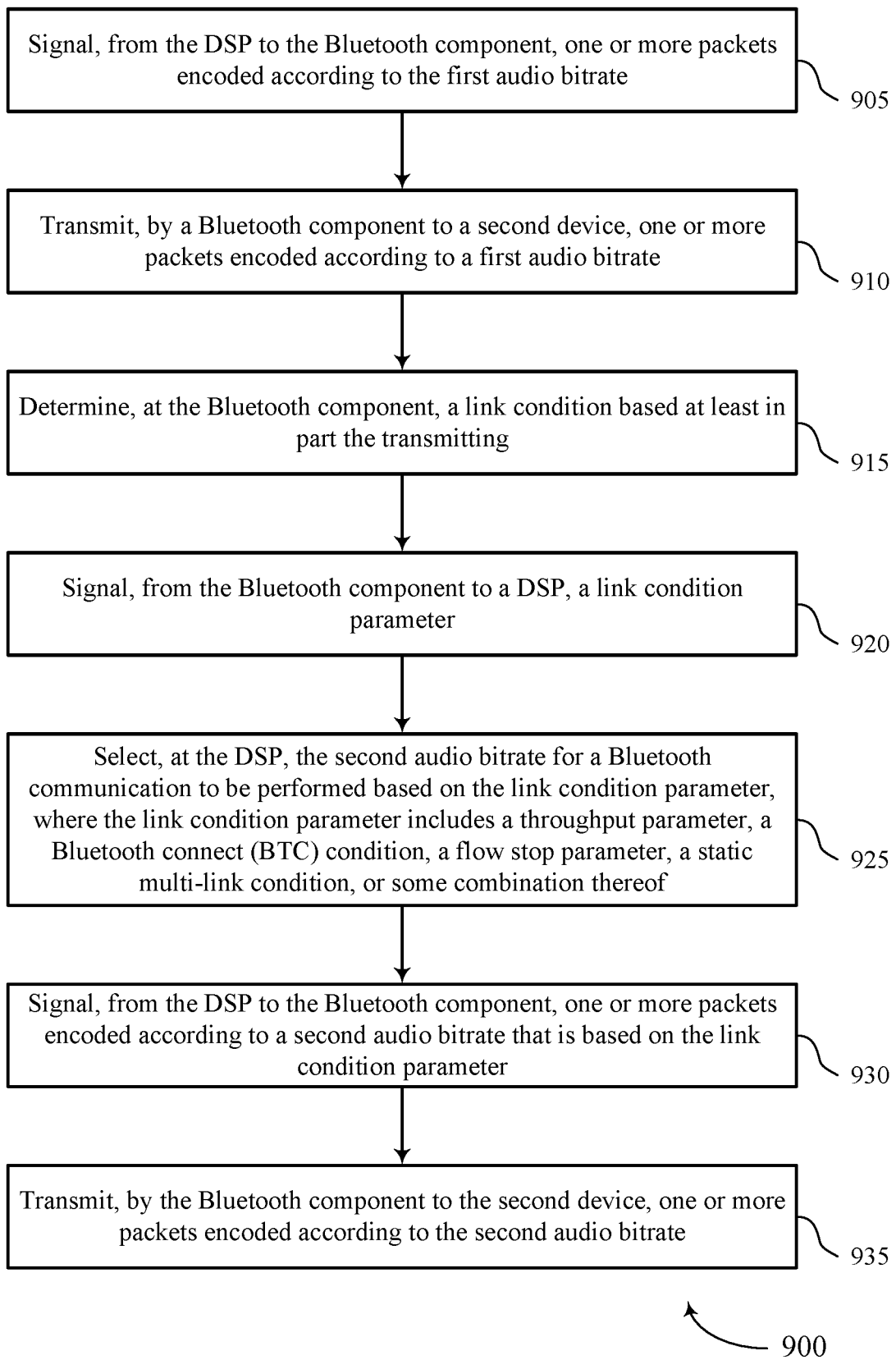

FIG. 9 shows a flowchart illustrating a method 900 that supports power optimized link quality detection and feedback in accordance with aspects of the present disclosure. The operations of method 900 may be implemented by a device or its components as described herein. For example, the operations of method 900 may be performed by a communications manager as described with reference to FIGS. 5 through 6. In some examples, a device may execute a set of instructions to control the functional elements of the device to perform the functions described below. Additionally or alternatively, a device may perform aspects of the functions described below using special-purpose hardware.

At 905, the device may signal, from the DSP to the Bluetooth component, one or more packets encoded according to the first audio bitrate. The operations of 905 may be performed according to the methods described herein. In some examples, aspects of the operations of 905 may be performed by an encoded packet manager as described with reference to FIGS. 5 through 6.

At 910, the device may transmit, by a Bluetooth component to a second device, one or more packets encoded according to a first audio bitrate. The operations of 910 may be performed according to the methods described herein. In some examples, aspects of the operations of 910 may be performed by a Bluetooth transmission manager as described with reference to FIGS. 5 through 6.

At 915, the device may determine, at the Bluetooth component, a link condition based at least in part the transmitting. The operations of 915 may be performed according to the methods described herein. In some examples, aspects of the operations of 915 may be performed by a Bluetooth link manager as described with reference to FIGS. 5 through 6.

At 920, the device may signal, from the Bluetooth component to a DSP, a link condition parameter. The operations of 920 may be performed according to the methods described herein. In some examples, aspects of the operations of 920 may be performed by a Bluetooth link manager as described with reference to FIGS. 5 through 6.

At 925, the device may select, at the DSP, the second audio bitrate for a Bluetooth communication to be performed based on the link condition parameter, where the link condition parameter includes a throughput parameter, a Bluetooth connect (BTC) condition, a flow stop parameter, a static multi-link condition, or some combination thereof. The operations of 925 may be performed according to the methods described herein. In some examples, aspects of the operations of 925 may be performed by an audio bitrate manager as described with reference to FIGS. 5 through 6.

At 930, the device may signal, from the DSP to the Bluetooth component, one or more packets encoded according to a second audio bitrate that is based on the link condition parameter. The operations of 930 may be performed according to the methods described herein. In some examples, aspects of the operations of 930 may be performed by an encoded packet manager as described with reference to FIGS. 5 through 6.

At 935, the device may transmit, by the Bluetooth component to the second device, one or more packets encoded according to the second audio bitrate. The operations of 935 may be performed according to the methods described herein. In some examples, aspects of the operations of 935 may be performed by a Bluetooth transmission manager as described with reference to FIGS. 5 through 6.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a device, comprising:
    transmitting, by a Bluetooth component to a second device, one or more packets encoded according to a first audio bitrate;
    determining, at the Bluetooth component, a link condition based at least in part on the transmitting;
    comparing the link condition to a plurality of thresholds, wherein each threshold of the plurality of thresholds is associated with a respective quality level of a plurality of quality levels and the plurality of thresholds comprises at least a first threshold for increasing an audio bitrate and a second threshold for decreasing the audio bitrate;
    selecting, at the Bluetooth component, a second audio bitrate for a Bluetooth communication to be performed based at least in part on the comparing and the link condition satisfying a threshold of the plurality of thresholds;
    signaling, from the Bluetooth component to a digital signal processor (DSP), a link condition parameter comprising the second audio bitrate based at least in part on the selecting;
    signaling, from the DSP to the Bluetooth component, one or more packets encoded according to the second audio bitrate that is based at least in part on the link condition parameter; and
    transmitting, by the Bluetooth component to the second device, the one or more packets encoded according to the second audio bitrate.

2. The method of claim 1,
    wherein the link condition parameter further comprises a throughput parameter, a Bluetooth connect (BTC) condition, a flow stop parameter, a static multi-link condition, or some combination thereof.

3. The method of claim 2, wherein signaling the link condition parameter from the Bluetooth component to the DSP comprises:
    signaling, from the Bluetooth component to an encoding block of the DSP, the link condition parameter.

4. The method of claim 1, wherein signaling the link condition parameter from the Bluetooth component to the DSP comprises:
    signaling, from the Bluetooth component to an applications processor, the link condition parameter; and
    signaling, from the applications processor to the DSP, the link condition parameter.

5. The method of claim 1, wherein signaling the link condition parameter from the Bluetooth component to the DSP comprises:
    signaling the link condition parameter from the Bluetooth component to the DSP while an applications processor is operating in a low power mode.

6. The method of claim 1, wherein selecting the second audio bitrate comprises:
    determining that the link condition is below the second threshold; and
    selecting the second audio bitrate based at least in part on the determination that the link condition is below the second threshold, wherein the second audio bitrate is less than the first audio bitrate.

7. The method of claim 1, wherein selecting the second audio bitrate comprises:
    determining that the link condition is above the first threshold; and selecting the second audio bitrate based at least in part on the determination that the link condition is above the first threshold, wherein the second audio bitrate is greater than the first audio bitrate.

8. The method of claim 1, further comprising:
signaling, from the DSP to the Bluetooth component, the one or more packets encoded according to the first audio bitrate.

9. The method of claim 1, wherein the comparing comprises:
determining that the link condition satisfies each threshold of the plurality of thresholds corresponding to the second audio bitrate, wherein selecting the second audio bitrate is further based at least in part on the link condition satisfying each threshold corresponding to the second audio bitrate.

10. The method of claim 1, wherein the comparing comprises:
determining that the link condition fails to satisfy at least one threshold of the plurality of thresholds corresponding to the first audio bitrate, wherein selecting the second audio bitrate is further based at least in part on the link condition failing to satisfy the at least one threshold corresponding to the first audio bitrate.

11. The method of claim 1, wherein signaling the link condition parameter from the Bluetooth component to the DSP comprises:
signaling the link condition parameter directly from the Bluetooth component to the DSP, bypassing an applications processor connected to the DSP.

12. An apparatus for wireless communication at a device, comprising:
a processor,
memory in electronic communication with the processor; and
instructions stored in the memory and executable by the processor to cause the apparatus to:
transmit, by a Bluetooth component to a second device, one or more packets encoded according to a first audio bitrate;
determine, at the Bluetooth component, a link condition based at least in part on the transmitting;
compare the link condition to a plurality of thresholds, wherein each threshold of the plurality of thresholds is associated with a respective quality level of a plurality of quality levels and the plurality of thresholds comprises at least a first threshold for increasing an audio bitrate and a second threshold for decreasing the audio bitrate;
select, at the Bluetooth component, a second audio bitrate for a Bluetooth communication to be performed based at least in part on the comparing and the link condition satisfying a threshold of the plurality of thresholds;
signal, from the Bluetooth component to a digital signal processor (DSP), a link condition parameter comprising the second audio bitrate based at least in part on the selecting;
signal, from the DSP to the Bluetooth component, one or more packets encoded according to the second audio bitrate that is based at least in part on the link condition parameter; and
transmit, by the Bluetooth component to the second device, the one or more packets encoded according to the second audio bitrate.

13. The apparatus of claim 12, wherein
the link condition parameter further comprises a throughput parameter, a Bluetooth connect (BTC) condition, a flow stop parameter, a static multi-link condition, or some combination thereof.

14. The apparatus of claim 13, wherein the instructions to signal the link condition parameter from the Bluetooth component to the DSP are executable by the processor to cause the apparatus to:
signal, from the Bluetooth component to an encoding block of the DSP, the link condition parameter.

15. The apparatus of claim 12, wherein the instructions to signal the link condition parameter from the Bluetooth component to the DSP are executable by the processor to cause the apparatus to:
signal, from the Bluetooth component to an applications processor, the link condition parameter; and
signal, from the applications processor to the DSP, the link condition parameter.

16. The apparatus of claim 12, wherein the instructions to signal the link condition parameter from the Bluetooth component to the DSP are executable by the processor to cause the apparatus to:
signal the link condition parameter from the Bluetooth component to the DSP while an applications processor is operating in a low power mode.

17. The apparatus of claim 12, wherein the instructions executable to select the second audio bitrate are further executable by the processor to cause the apparatus to:
determine that the link condition is below the second threshold; and
select the second audio bitrate based at least in part on the determination that the link condition is below the second threshold, wherein the second audio bitrate is less than the first audio bitrate.

18. The apparatus of claim 12, wherein the instructions executable to select the second audio bitrate are further executable by the processor to cause the apparatus to:
determine that the link condition is above the first threshold; and
select the second audio bitrate based at least in part on the determination that the link condition is above the first threshold, wherein the second audio bitrate is greater than the first audio bitrate.

19. An apparatus for wireless communication at a device, comprising:
means for transmitting, by a Bluetooth component to a second device, one or more packets encoded according to a first audio bitrate;
means for determining, at the Bluetooth component, a link condition based at least in part on the transmitting;
means for comparing the link condition to a plurality of thresholds, wherein each threshold of the plurality of thresholds is associated with a respective quality level of a plurality of quality levels and the plurality of thresholds comprises at least a first threshold for increasing an audio bitrate and a second threshold for decreasing the audio bitrate;
means for selecting, at the Bluetooth component, a second audio bitrate for a Bluetooth communication to be performed based at least in part on the comparing and the link condition satisfying a threshold of the plurality of thresholds;
means for signaling, from the Bluetooth component to a digital signal processor (DSP), a link condition parameter comprising the second audio bitrate based at least in part on the selecting;

means for signaling, from the DSP to the Bluetooth component, one or more packets encoded according to the second audio bitrate that is based at least in part on the link condition parameter; and means for transmitting, by the Bluetooth component to the second device, the one or more packets encoded according to the second audio bitrate.

* * * * *